United States Patent
Jung

(10) Patent No.: US 8,656,085 B2
(45) Date of Patent: Feb. 18, 2014

(54) FLASH MEMORY DEVICE AND METHOD FOR PROGRAMMING FLASH MEMORY DEVICE

(75) Inventor: Jae-gyu Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 12/728,359

(22) Filed: Mar. 22, 2010

(65) Prior Publication Data

US 2010/0332735 A1 Dec. 30, 2010

(30) Foreign Application Priority Data

Jun. 29, 2009 (KR) ........................ 10-2009-0058583

(51) Int. Cl.
*G06F 12/00* (2006.01)
*G06F 13/00* (2006.01)
*G06F 13/28* (2006.01)

(52) U.S. Cl.
USPC .......................................................... 711/103

(58) Field of Classification Search
USPC .......................................................... 711/103
See application file for complete search history.

(56) References Cited

U.S. PATENT DOCUMENTS

| | | | | |
|---|---|---|---|---|
| 6,687,205 | B1 * | 2/2004 | Huber | 369/47.19 |
| 7,003,045 | B2 * | 2/2006 | Morgan et al. | 375/265 |
| 8,078,827 | B2 * | 12/2011 | Uhlig et al. | 711/206 |
| 2008/0192539 | A1 | 8/2008 | Choi et al. | |
| 2008/0215954 | A1 | 9/2008 | Oshikiri | |
| 2008/0301532 | A1 | 12/2008 | Uchikawa et al. | |
| 2009/0034328 | A1 | 2/2009 | Seol | |
| 2009/0073762 | A1 | 3/2009 | Lee et al. | |
| 2009/0132761 | A1 * | 5/2009 | Yim et al. | 711/114 |
| 2009/0316490 | A1 * | 12/2009 | Takada | 365/185.26 |

FOREIGN PATENT DOCUMENTS

| | | |
|---|---|---|
| JP | 2007-066386 | 3/2007 |
| JP | 2008-077810 | 4/2008 |
| JP | 2008-198310 | 8/2008 |
| JP | 2009-037317 | 2/2009 |
| JP | 2009-037619 | 2/2009 |
| JP | 2009-048750 | 3/2009 |
| KR | 10-2008-0074585 | 8/2008 |
| KR | 10-2009-0006637 | 1/2009 |
| KR | 10-2009-0014036 | 2/2009 |
| KR | 10-2009-022435 | 3/2009 |

OTHER PUBLICATIONS

Talluri, "Surpassing the TLB Performance of Superpages with Less Operating System Support", Oct. 1994.*
JaeGyu Jung, et al, "Spread Programming using Orthogonal Code for Alleviating the Bit Error of NAND Flash Memory," *In Proc. of 2010 International Conference on Consumer Electronics (ICCE) Session* p. 1-9, Jan. 11, 2010, pp. 1-2.

* cited by examiner

*Primary Examiner* — Matthew Bradley
*Assistant Examiner* — Rocio Del Mar Perez-Velez
(74) *Attorney, Agent, or Firm* — NSIP Law

(57) ABSTRACT

A flash memory device resilient to bit errors and a programming method suitable for the flash memory are provided. The flash memory device stores data in a parallel manner in a superpage which is generated by grouping a plurality of physical pages into a logical page. The flash memory device spreads input data using a predetermined spreading code to generate spread data. The spread data is stored on a superpage-by-superpage basis.

21 Claims, 11 Drawing Sheets

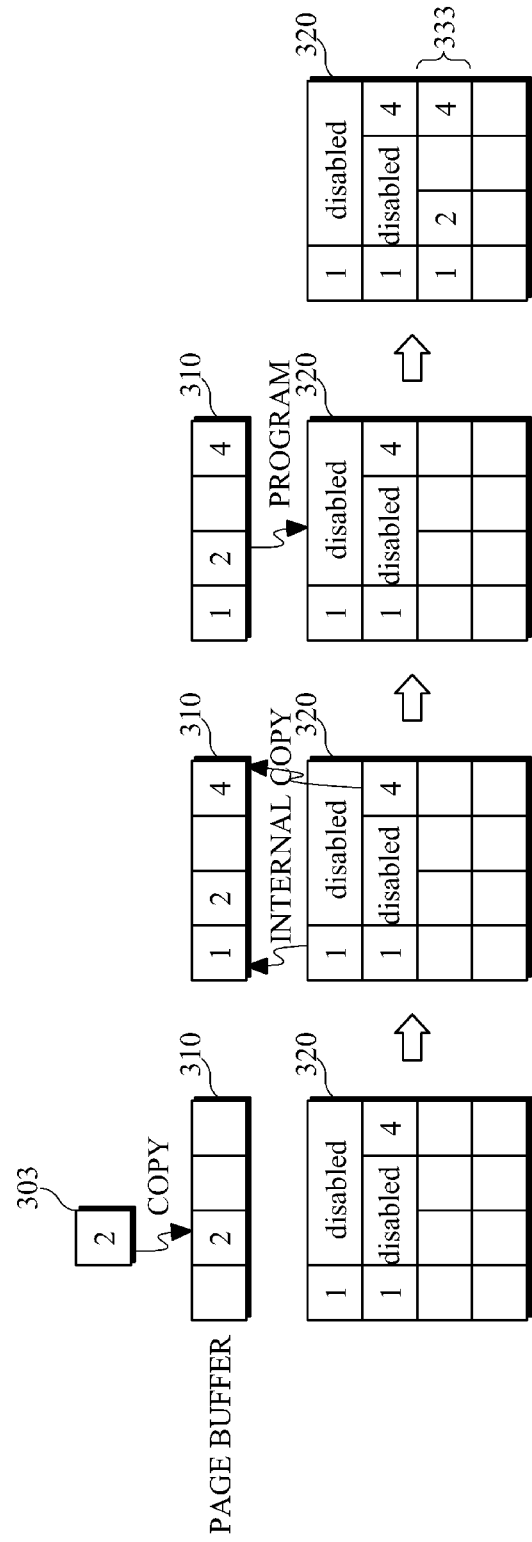

FIG.6A

| | |
|---|---|
| ORIGINAL DATA | 1 |
| SPREADING CODE | 1 -1 -1 1 -1 1 1 -1 |
| SPREAD DATA | 1 -1 -1 1 -1 1 1 -1 |
| SPREAD DATA × SPREADING CODE | 1 1 1 1 1 1 1 1 |

$$8 \rightarrow 1$$

| | |
|---|---|
| ERROR IN SPREAD DATA | 1 -1 (1) 1 -1 (-1) 1 -1 |
| | 601  602 |
| SPREAD DATA × SPREADING CODE | 1 1 -1 1 1 -1 1 1 |

$$4 \rightarrow 1$$

FIG.6B

| | |
|---|---|
| ORIGINAL DATA | -1 |
| SPREADING CODE | 1 -1 -1 1 -1 1 1 -1 |
| SPREAD DATA | -1 1 1 -1 1 -1 -1 1 |
| SPREAD DATA × SPREADING CODE | -1 -1 -1 -1 -1 -1 -1 -1 |

$$-8 \rightarrow -1$$

| | |
|---|---|
| | 611 612 613 |
| ERROR IN SPREAD DATA | -1 (-1)(-1)(1) 1 -1 -1 1 |
| SPREAD DATA × SPREADING CODE | -1 1 1 1 -1 -1 -1 -1 |

$$-2 \rightarrow -1$$

FLASH MEMORY DEVICE AND METHOD FOR PROGRAMMING FLASH MEMORY DEVICE

CROSS REFERENCE TO RELATED APPLICATION

This application claims the benefit under 35 U.S.C. §119(a) of a Korean Patent Application No. 10-2009-0058583, filed on Jun. 29, 2009, the entire disclosure of which is incorporated herein by reference for all purposes.

BACKGROUND

1. Field

The following description relates to a flash memory device, and more particularly, to a flash memory resilient to corruption due to data bit errors and a method for programming the flash memory.

2. Description of the Related Art

In line with data-oriented development and increasingly widespread distribution of mobile terminals such as personal digital assistants, MP3 players, mobile phones, digital cameras, and the like, the use of high-density flash memory as a data storage medium is continually increasing. A high-density flash memory device may include a multi level cell (MLC) NAND flash memory which stores a number of bits in one memory cell. However, according to the MLC technique, a higher number of bits are written in a single cell, thus causing an increase in bit error rate and an increase in the complexity of software for compensating for the increased bit error rate.

In general, the bit error rate (BER) is the percentage of bits that have errors or are not received relative to the total number of bits sent in a transmission. If a bit fails to be received, the bit must be transmitted again, therefore reducing the efficiency of the overall system.

SUMMARY

In one general aspect, provided is a flash memory device which stores data in a parallel manner, the device comprising a memory control unit to generate spread data by spreading input data in a parallel manner using a spreading code, generating a superpage by grouping a plurality of physical pages into a logical page, and storing the generated spread data in the superpage, and a flash memory to store the spread data on a superpage-by-superpage basis.

The memory control unit may generate the spread data using a direct sequence spread spectrum (DSSS) method.

The memory control unit may generate first spread data by spreading first data using a first spreading code, may store the first spread data in a first superpage, may form second spread data by spreading second data input subsequent to the first data using a second spreading code, may combine the first spread data and the second spread data to generate combined data, and may store the combined data in a second superpage.

The first spreading code may be assigned according to a logical address at which the first data is to be stored and the second spreading code may be assigned according to a logical address at which the second data is to be stored.

The spreading code may be an orthogonal code.

The orthogonal code may be a Walsh code.

The memory control unit may despread the spread data using the spreading code to restore the originally input data.

The memory control unit may despread the combined data using the first spreading code to restore the first data.

The memory control unit may despread the combined data using the second spreading code to restore the second data.

In another aspect, provided is a programming method for a flash memory device which stores data in a parallel manner, the programming method comprising generating spread data by spreading input data in a parallel manner using a spreading code, generating a superpage by grouping a plurality of physical pages into a logical page, and storing the generated spread data in the superpage, wherein the flash memory stores spread data on a superpage-by-superpage basis.

The generating of the spread data may include spreading the input data using a direct sequence spread spectrum (DSSS) method.

The programming method may further comprise generating first spread data by spreading first data using a first spreading code, storing the first spread data in a first superpage, inputting second data subsequent to the first data, generating second spread data by spreading the second data using a second spreading code, and storing combined data obtained by adding the first spread data and the second spread data in a second superpage.

The first spreading code may be assigned according to a logical address at which the first data is to be stored and the second spreading code may be assigned according to a logical address at which the second data is to be stored.

The spreading code may be an orthogonal code.

The orthogonal code may be a Walsh code.

The programming method may further comprise restoring the originally input data by despreading the spread data using the spreading code.

The programming method may further comprise restoring the first data by despreading the combined data using the first spreading code.

The programming method may further comprise restoring the second data by despreading the combined data using the second spreading code.

Other features and aspects will be apparent from the following detailed description, the drawings, and the claims.

BRIEF DESCRIPTION OF THE DRAWINGS

FIGS. 3A to 3C are diagrams illustrating a general write operation performed on a superpage-by-superpage basis.

FIGS. 6A and 6B are examples illustrating bit-error-robustness of spread data.

Throughout the drawings and the description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and structures may be omitted for increased clarity and conciseness.

Figure 1:
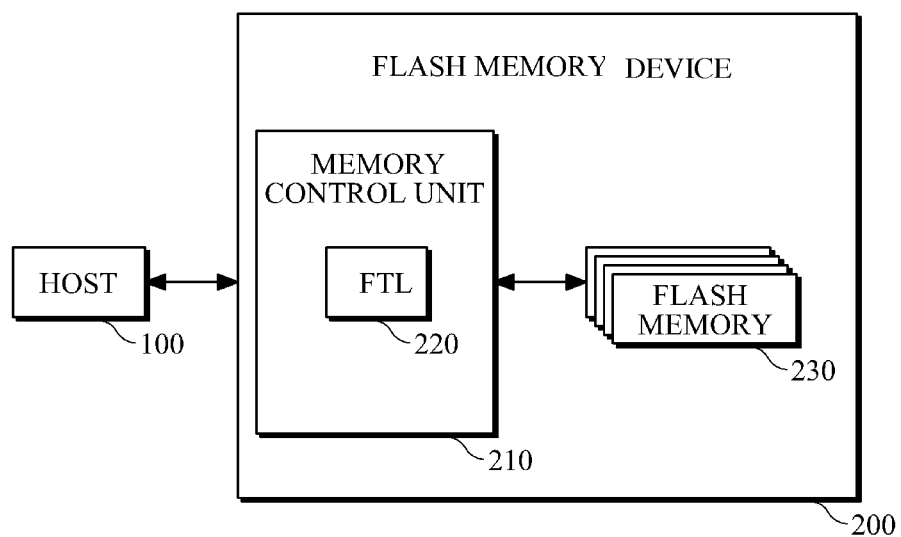
FIG. 1 is a diagram illustrating an example of a flash memory device.

FIG. 1 illustrates an example of a flash memory device.

The example flash memory device 200 receives a request from an application running in a host 100 for accessing the flash memory device 200. For example, the request may include a data write request, a data read request, and the like for accessing the flash memory device 200. The flash memory device 200 operates in response to the received request to perform the request. The application may include an operating system and one or more programs controlled by the operating system.

The flash memory device 200 includes a memory control unit 210 and at least one flash memory 230. The memory control unit 210 may include a flash translation layer (FTL) 220 that allows the application running in the host 100 to access the flash memory device 200 while the flash memory device 200 is using a hard disk as a memory.

The FTL 220 may include a page table to transform a logical address transferred from the application into a physical address. Each physical address in the page table may include an address of a superpage and addresses of a plurality of pages included in the superpage. Although FIG. 1 illustrates that the FTL 220 is included in the memory control unit 210, the FTL 220 may vary in its configuration. For example, the FTL 220 may be configured as a device driver included in the host 100. The memory control unit 210 transforms the logical address input from the host 100 into the physical address with reference to the page table, and provides the transformed physical address to the flash memory 230.

The memory control unit 210 controls the flash memory 230 to store data in a parallel manner in a superpage. The memory control unit 210 generates a superpage by grouping a plurality of physical pages into one logical page. In addition, the memory control unit 210 spreads input data using a predetermined spreading code to generate spread data. For example, an existing spreading method may be used, a direct sequence spread spectrum (DSSS) method may be used, a code division multiple access (CDMA) in telecommunications may be used, and the like.

The memory control unit 210 controls the flash memory 230 to store the spread data on a superpage-by-superpage basis.

The flash memory 230 may include one or more NAND flash memory. Additionally, the flash memory 230 may include control units and a page buffer. Each of the control units may be used to program data at a particular address in a general flash memory, and the page buffer may temporarily store data loaded from the memory control unit 210 in order to program data in the flash memory 230.

The flash memory device 200 may apply a spread spectrum technique for programming of the flash memory, thereby reducing a bit error rate. Generally, the spread spectrum technique may be used to establish secure communications and to increase resistance against natural external interference. DSSS is an example of one of the spread spectrum techniques that generates noise-like data by multiplying data and a pseudo noise (PN) code. DSSS may restore the original data using the same PN code in combination with the generated data.

The memory control unit 210 may spread original data using orthogonal codes. The orthogonal codes have zero cross-correlation, that is, they do not interfere with each other. Thus, the original data may be effectively restored from the non-interfered spread data. An example of an orthogonal code is the Walsh code or Walsh matrix, but the type of orthogonal code is not limited thereto. For convenience of explanation, and by way of example, a programming method employing the Walsh code to program data in a flash memory is described herein.

The memory control unit 210 may assign different Walsh codes with respect to the individual logical pages included in the same superpage. The memory control unit 210 may generate spread data by multiplying data to be stored at the respective logical page addresses with the assigned Walsh codes. The memory control unit 210 may program the generated spread data in the flash memory 230. Even when spread data has the same size as the superpage, the memory control unit 210 may accumulate the spread data to be stored in all logical pages included in the same superpage in a single superpage. That is, when storing two or more pieces of data in one superpage, data generated by combining spread data of the individual data may also be stored.

The memory control unit 210 may despread data using a spreading code, thereby restoring the data to original data. The process of despreading allows the original information to be extracted from the spread information. For example, in response to a request for a logical page from an application of the host 100, the memory control unit 210 may load data in units to a superpage, for example, a minimum read/program unit, and the like. The memory control unit 210 may multiply the data of the superpage by the spreading code assigned to the requested logical page so as to despread data of the requested logical page.

The memory control unit 210 may be configured to include a spreading module to spread data, a despreading module to despread the spread data, a buffer memory to store data temporarily, and/or a combiner to combine two or more pieces of the spread data. The spreading module which multiplies data by a spreading code and/or the despreading module which multiplies the spread data by a despreading code may be configured as modules that perform an XOR operation.

The flash memory device 200 may be included in various devices, apparatuses, and/or systems, for example, a mobile terminal, a computer, and the like.

Figure 2:
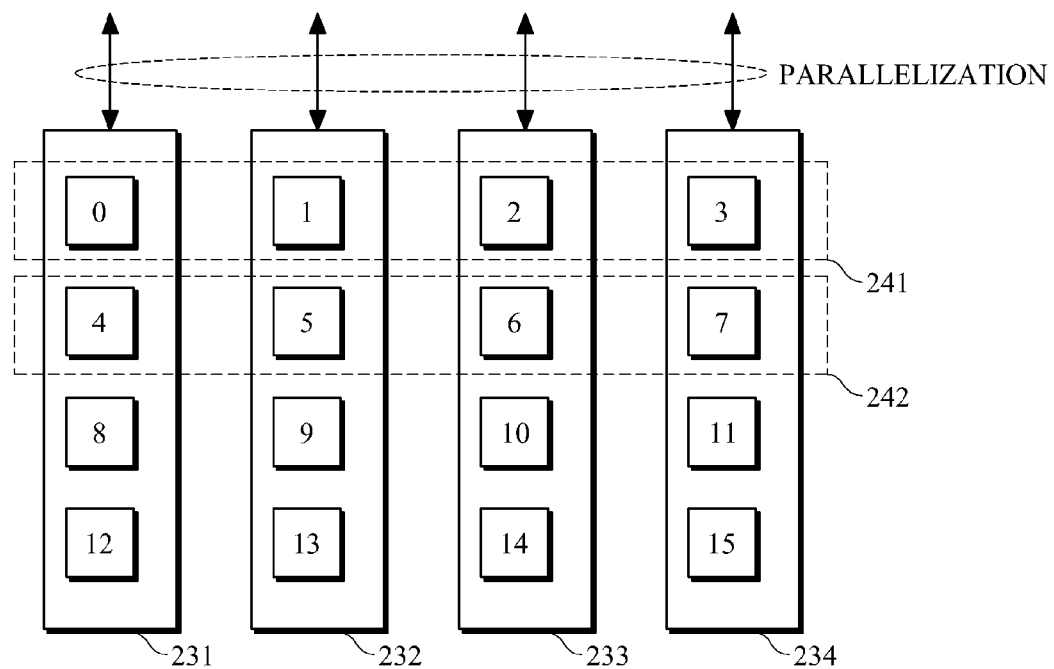
FIG. 2 is a diagram illustrating an example of a parallelism-based flash memory that may be included in the example flash memory device illustrated in FIG. 1.

FIG. 2 illustrates an example of a parallelism-based flash memory 230 that may be included in the example flash memory device illustrated in FIG. 1.

In order to compensate for degradation of programming performance, a flash memory may employ parallelism in which input data is transferred to the flash memory through multiple channels, for example, two channels, three channels, four channels, or more. Based on the parallelism, a number of physical pages may be processed simultaneously. Such pages to be processed simultaneously and grouped together logically are referred to as a 'superpage.' A read operation and a write operation may be performed in units of a superpage. The flash memory cannot overwrite the same page before erasing, and thus, internal fragmentation inevitably occurs.

The flash memory device 200 processes a number of physical logical pages simultaneously using parallelism. When the flash memory is configured as illustrated in the example of FIG. 2, blocks 231, 232, 233, and 234 may be either flash memory chips or planes included in a single flash memory chip. The blocks 231, 232, 233, and 234 may be configured with various sizes and forms according to the data unit size required by an application.

In the example where four physical pages are mapped to a logical address, when data related to one logical address is input, the respective blocks 231, 232, 233, and 234 are used to store data, such that four pages are used to store data in parallel. In the example of FIG. 2, a superpage 241 includes a page 0, a page 1, a page 2, and a page 3, and a superpage 242 includes a page 4, a page 5, a page 6, and a page 7. As described above, a read operation and a write operation may be performed on a superpage-by-superpage basis in the flash memory device 230.

Figure 3A:
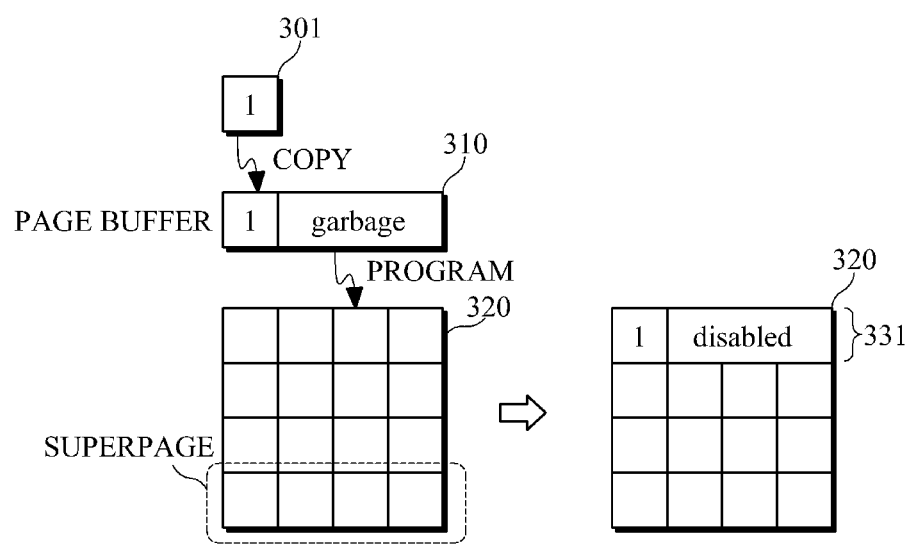
Figure 3B:
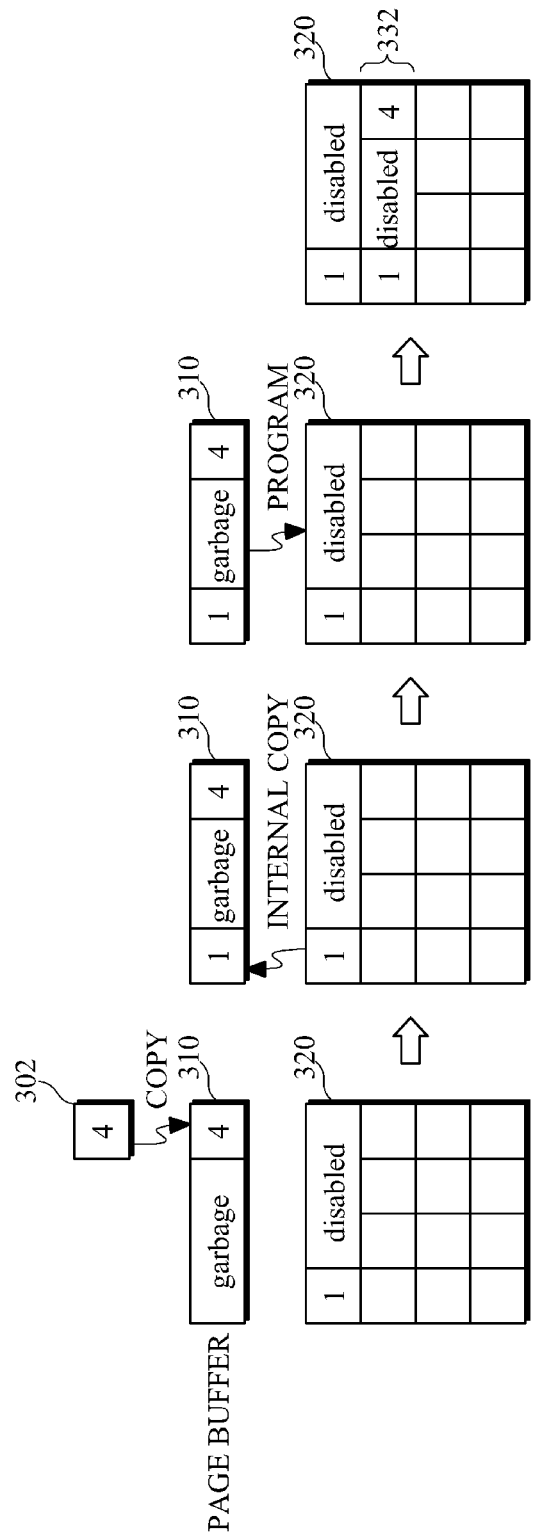

FIGS. 3A to 3C a general write operation performed on a superpage-by-superpage basis.

Referring to FIG. 3A, a flash memory 320 shows free pages where data is not yet written. When an application requests to write data "1" 301 to a page 1, the data 301 is copied to a page buffer 310. In this example, page 1 represents a logical address. The data copied in the page buffer 310 is stored in units of a superpage in a flash memory 320, and a page 331 to which the data "1" 301 is programmed is generated in the flash memory 320. At this time, a page table that maps the logical addresses and physical addresses may be changed to indicate that the data 301 is stored in the superpage 331.

Referring to FIG. 3B, when an application requests to write data "4" 302 to a page 4, the data "4" 302 is copied to the page buffer 310. In this example, page 4 represents a logical address. In order to store the previously stored data "1" 301 and the data "4" 302 in the same superpage, the data "1" 301 is internally copied to the page buffer 310. Then, the contents of the page buffer 310, which contains the data "1" 301 and the data "4" 302, may be stored in a free superpage 332 of the flash memory 320. The page table that maps the logical addresses and the physical addresses may be changed to indicate the data 301 and the data 302 are stored in the superpage 332.

Referring to FIG. 3C, when an application requests to write data "2" 303 to a page 2, the data "2" 303 is copied to the page buffer 310. In this example, page 2 represents a logical address. To store previously stored data 301 and 302 and the current data "2" 303 in the same superpage, the data "1" 301 and the data "4" 302 are internally copied to the page buffer 310. Thereafter, the contents of the page buffer, which contains the data "1" 301, the data "4" 302 and the data "2", is stored in a subsequent free superpage 333 of the flash memory 320. Again, the page table that maps the logical addresses and the physical addresses may be changed to indicate that the data 301, the data 302, and the data 303 are stored in the superpage 332.

As shown in FIGS. 3A to 3C, when the data "1" 301, the data "4" 302, and the data "2" 303 are not simultaneously stored but instead are stored subsequently, internal fragmentation occurs in the flash memory 320, and thus storage areas of the flash memory 320, as represented by "disabled" in FIGS. 3A to 3C, are wasted.

Figure 4A:
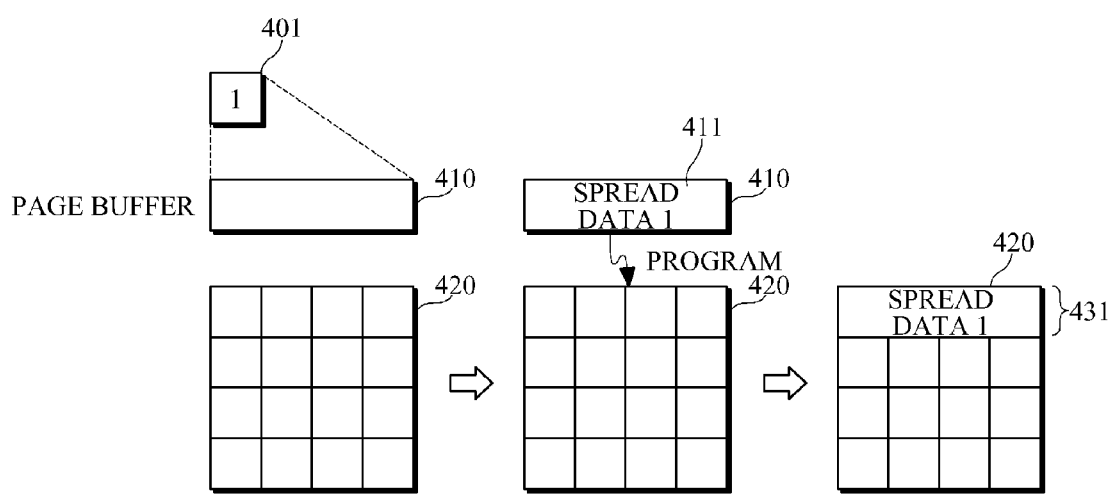
FIGS. 4A and 4B are diagrams illustrating an example of a write operation performed on a superpage-by-superpage basis, according to various embodiments.
Figure 4B:
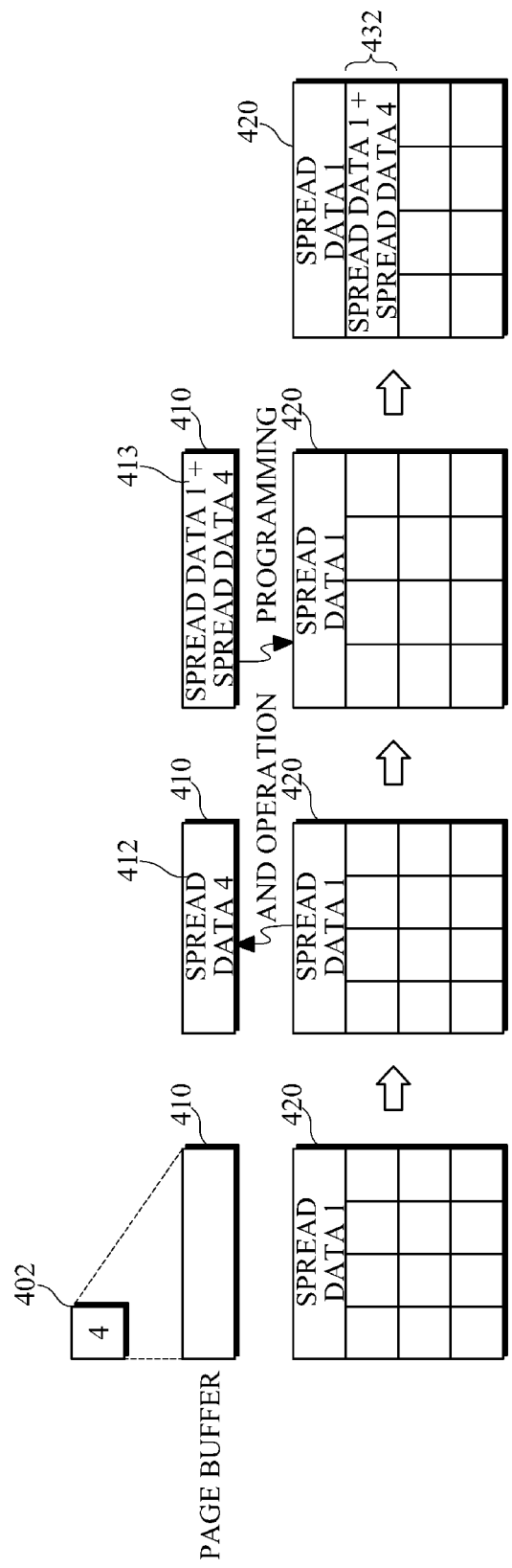

FIGS. 4A and 4B illustrate an example of a write operation performed on a superpage-by-superpage basis, according to various embodiments.

Referring to FIG. 4A, when an application requests to write data "1" 401 to a page 1, the data "1" 401 may be spread using a predetermined code and the spread data "1" 411 may be stored in a page buffer 410. In this example, page 1 represents a logical address. The spread data "1" 411 which is temporarily stored in the page buffer 410 is programmed to a flash memory 420 in units of a superpage. As the result, a page 431 to which the spread data "1" 411 is programmed is generated in the flash memory 420. A page table that maps the logical addresses and the physical addresses may be changed to indicate that the data "1" 401 is stored in the superpage 431.

Referring to FIG. 4B, when an application requests to write data "4" 402 in a page 4, the data "4" 402 may be spread using a predetermined code that is different from the code used for spreading the data "1." The spread data "4" 412 is stored in the page buffer 410. To prevent waste of unused memory, the spread data "1" 411 and the spread data "4" 412 are combined, and data 413 resulting from combining the spread data 411 and 412 is stored in a superpage 432.

The page buffer 410 stores a result of combining the spread data "1" 411 stored in the superpage 431 and the spread data "4" 412 stored in the page buffer 410. The result 413 of combining the spread data "1" 411 and the spread data "4" 412 is stored in the superpage 432. The page table is changed to indicate that the spread data "1" 411 and the spread data "4" 412 are stored in the superpage 432. As such, when spread data created by spreading input data is stored in the flash memory, memory area is not wasted because the data is stored by parallel storage of flash memory through multi-channels. Thus, bit errors may be spread and the original data may be restored even if an error occurs in one or more bits.

The spreading code assigned to spread data may be predetermined according to a logical address at which the data is to be stored. For example, the spreading code used to spread the data "1" 401 may be assigned according to the logical address at which the data "1" 401 is to be stored, and the spreading code used to spread the data "4" 402 may be assigned according to the logical address at which the data "4" 402 is to be stored.

Referring back to FIG. 2, for example, when the page numbers included in the respective blocks 231, 232, 233, and 234 are the same as the logical page addresses, one or more spreading codes may be used. For example, a first spreading code may be determined to be used to spread data for the logical pages 0, 4, 8, and 12, a second spreading code may be determined to be used to spread data for the logical pages 1, 5, 9, and 13, a third spreading code may be determined to be used to spread data for the logical pages 2, 6, 10, and 14, and a fourth spreading code may be determined to be used to spread data for the logical pages 3, 7, 11, and 15. Information about the spreading code that is set according to an address of a logical page may be included in a page table.

According to various embodiments, a programming method suitable for a flash memory may include spreading data and combining the spread data before writing, and may include despreading the spread data before reading data. The programming method may include one or more additional operations during programming, for example, an XOR operation, a summation operation, and the like. The programming method enables the simplification of a general complicated error correction mechanism because the one or more additional operations are simple operations, such as an XOR operation and a summation operation, which reduces a bit error rate. Therefore, overhead due to the above programming method may be reduced. In addition, in an example where two or more pieces of spread data are combined together and the resultant data is stored in a single superpage, updating of some of stored original data may be performed by storing spread data of the updated data in a superpage different from the previous superpage that stores the spread data.

Figure 5A:
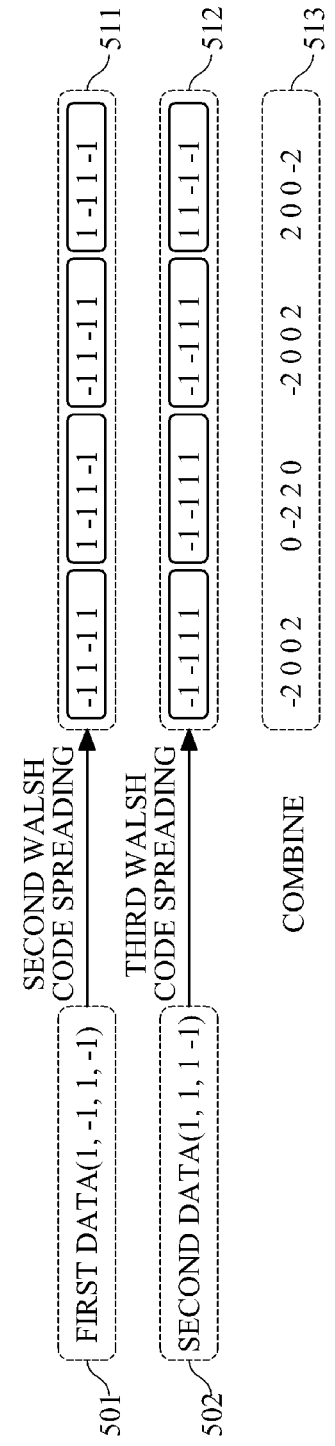
FIGS. 5A to 5C are diagrams illustrating an example of a data spread operation and a data restoration operation.
Figure 5B:
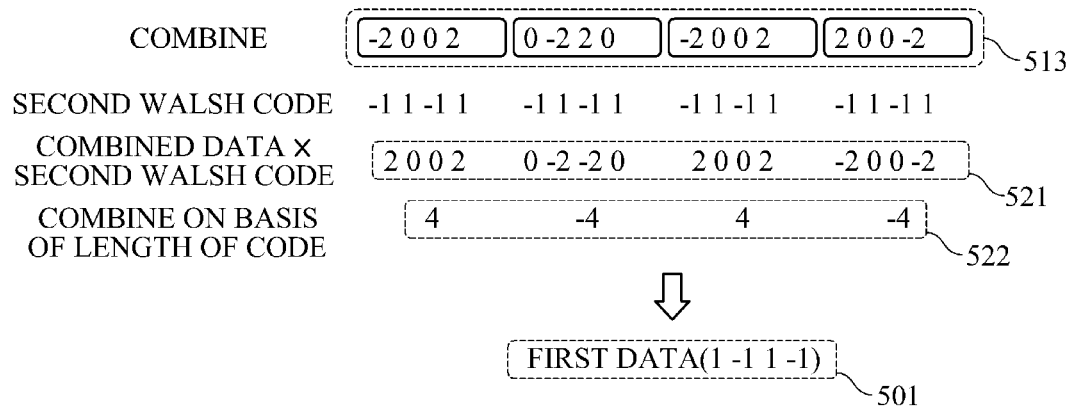
Figure 5C:
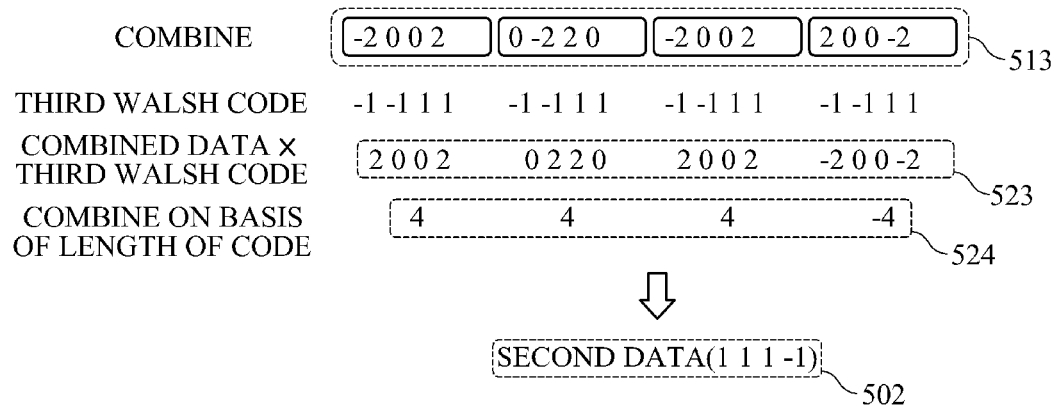

FIGS. 5A to 5C illustrate examples of a data spread operation and a data restoration operation.

The Walsh codes are orthogonal codes, and as they are orthogonal to each other no interference occurs between them. The example 4-bit Walsh codes may be represented as shown below.

A first Walsh code may be (−1, −1, −1, −1).
A second Walsh may be code (−1, 1, −1, 1).
A third Walsh may be code (−1, −1, 1, 1).
A fourth Walsh code may be (−1, 1, 1, −1).

Referring to the example shown in FIG. 5A, the first data 501 is (1, −1, 1, −1) and the second data 502 is (1, 1, 1, −1). The first data 501 and the second data 502 may be spread using a Walsh code, and the spread data may be stored in flash memory. In FIG. 5A, a data value "0" is represented as "−1" for spreading data.

In this example, the first spread data 511 is generated by spreading the first data 501 using the second Walsh code, and the second spread data 512 is generated by spreading the second data 502 using the third Walsh code. The first spread data 511 and the second spread data 512 are summed to generate combined data 513.

Referring to FIG. 5B, when the combined data 513 is multiplied by the second Walsh code which was used to spread the first data 501, data 521 is generated. The bits of the data 521 are summed on the basis of the length of the Walsh code to generate data 522, and the generated data 522 may be restored to the initial first data 501.

Referring to FIG. 5C, when the combined data 513 is multiplied by the third Walsh code that was used to spread the second data 502, data 523 is generated. The bits of the data 523 are summed on the basis of the length of Walsh code to generate data 524, and the generated data 524 may be restored to the initial second data 502.

FIGS. 6A and 6B illustrate examples of bit-error-robustness of spread data.

FIG. 6A illustrates how a spreading code overcomes bit errors in spread data. In DSSS systems, the spreading code is a sequence of bits which represent individual bits of spread data. Thus, if a number of bit errors, less than half the bits of the spreading code, occur in the spread data, the spread data bit may be restored by despreading.

Referring to the example of FIG. 6A, when original data is 1 and a spreading code is (1, −1, −1, 1, −1, 1, 1, −1), then spread data will be (1, −1, −1, 1, −1, 1, 1, −1). The spread data may be multiplied by the spreading code that was used to generate the spread data, and the resultant data may be combined with the spread data, thereby obtaining a value of 8. The value 8 is a positive number and thus may be restored to a value of 1. Even when errors occur in bits of the spread data as represented by 601 and 602 in FIG. 6A, the original data may be restored by multiplying the spread data by the spreading code.

Referring to the example of FIG. 6B, when original data is −1 and a spreading code is (1, −1, −1, 1, −1, 1, 1, −1), then the spread data will be (−1, 1, 1, −1, 1, −1, −1, 1). The spread data may be multiplied by the spreading code that was used to generate the spread data, and the resultant data may be combined with the spread data, thereby obtaining a value of −8. The value −8 is a negative number and thus may be restored to a value of −1.

Even when errors occur in the spread data, denoted by 611, 612, and 613 in FIG. 6B, the original data may be restored by multiplying the spread data with the spreading code. The scattering effect generated by the spreading is beneficial for reducing bit errors. Generally, bit errors are more likely to occur in a particular bit array. While these bit errors cause the overall error of particular data, the above method of spreading and storing data may disperse the effects of errors over all pages of a superpage and allow the errors to be additionally corrected at an application level according to a data correction algorithm.

Figure 7:
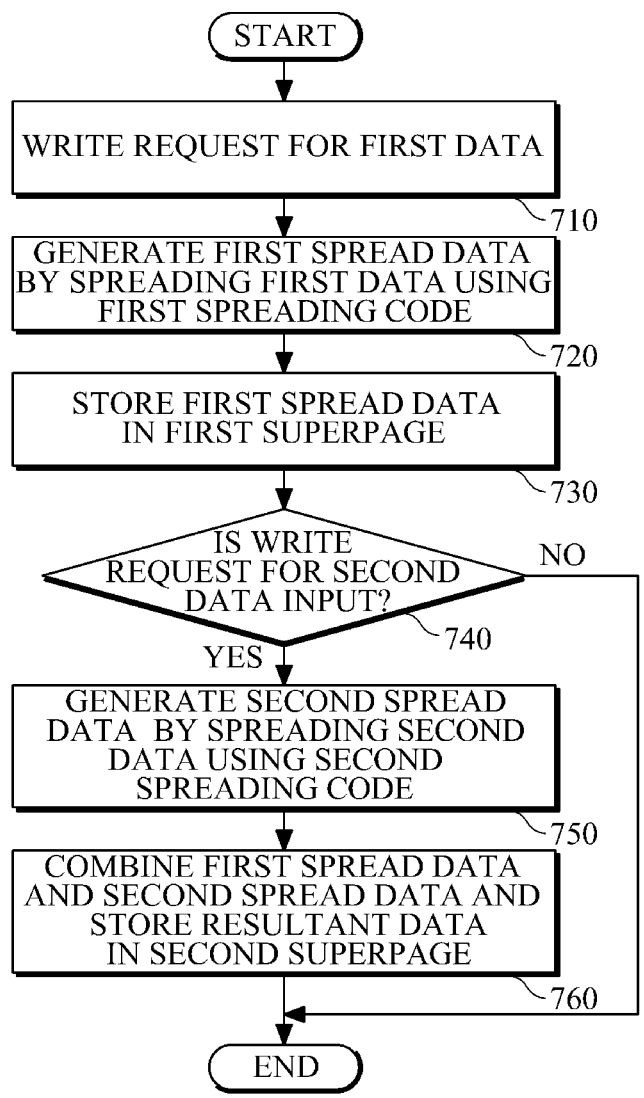
FIG. 7 is a flowchart illustrating an example method for programming a flash memory device.

FIG. 7 illustrates an example of a method for programming a flash memory device.

When a write request for first data is input at 710, the first data may be spread using a first spreading code to generate first spread data at 720. The first spreading code may be assigned according to a logical address at which the first data is to be stored. At 730, the first spread data is stored in a first superpage.

When a write request for second data subsequent to the first data is input at 740, the second data is spread using a second spreading code that is different from the first spreading code to generate second spread data at 750. The second spreading code may be assigned according to a logical address at which the second data is to be stored. The first spreading code and the second spreading code may be orthogonal codes that may be the Walsh codes.

The first spread data and the second spread data are summed together to generate combined data and the combined data is stored in a second superpage at 760.

The DSSS method may be used to spread the first data using the first spreading code and to spread the second data using the second spreading code that is different from the first spreading code. The first data may be restored by multiplying the combined data with the first spreading code, and the second data may be restored by multiplying the combined data with the second spreading code.

The spread data generated using a spreading code may be stored in flash memory, thereby producing a scattering effect that improves robustness against bit errors. Accordingly, if any bit errors do exist, they will be spread over all combined pages. Although the above spreading method increases the amount of data to be programmed, bits of data in each logical page are summed together such that they may be stacked, and the data in each logical page may be extracted by multiplying the data by a spreading code assigned for data spread.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A number of examples have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A flash memory device which stores data in a parallel manner, the flash memory device comprising:
    a memory control unit configured to generate spread data by spreading a page of input data in a parallel manner using a spreading code assigned according to a logical address at which the input data is to be stored, generate a superpage by grouping a plurality of physical pages into a logical page, and store the generated spread data of the page of input data in the plurality of physical pages of the superpage; and
    a flash memory configured to store the spread data on a superpage-by-superpage basis.

2. The flash memory device of claim 1, wherein the memory control unit is further configured to generate the spread data using a direct sequence spread spectrum (DSSS) method.

3. The flash memory device of claim 1, wherein the memory control unit is further configured to:
    generate first spread data by spreading first data using a first spreading code, and store the first spread data in a first superpage;
    generate second spread data by spreading second data input subsequent to the first data using a second spreading code;
    combine the first spread data and the second spread data to generate combined data; and
    store the combined data in a second superpage.

4. The flash memory device of claim 3, wherein:
    the first spreading code is assigned according to a logical address at which the first data is to be stored; and
    the second spreading code is assigned according to a logical address at which the second data is to be stored.

5. The flash memory device of claim 1, wherein the spreading code comprises an orthogonal code.

6. The flash memory device of claim 5, wherein the orthogonal code comprises a Walsh code.

7. The flash memory device of claim 1, wherein the memory control unit is further configured to despread the spread data using the spreading code to restore the originally input data.

8. The flash memory device of claim 3, wherein the memory control unit is further configured to despread the combined data using the first spreading code to restore the first data.

9. The flash memory device of claim 3, wherein the memory control unit is further configured to despread the combined data using the second spreading code to restore the second data.

10. A programming method for a flash memory device which stores data in a parallel manner, the programming method comprising:
    generating spread data by spreading a page of input data in a parallel manner using a spreading code assigned according to a logical address at which the input data is to be stored;
    generating a superpage by grouping a plurality of physical pages into a logical page; and
    storing the generated spread data of the page of input data in the plurality of physical pages of the superpage,
    wherein the flash memory stores spread data on a superpage-by-superpage basis.

11. The programming method of claim 10, wherein the generating of the spread data includes spreading the input data using a direct sequence spread spectrum (DSSS) method.

12. The programming method of claim 10, further comprising:
    generating first spread data by spreading first data using a first spreading code;
    storing the first spread data in a first superpage;
    inputting second data subsequent to the first data;
    generating second spread data by spreading the second data using a second spreading code; and generating combined data by adding the first spread data and the second spread data and storing the combined data in a second superpage.

13. The programming method of claim 12, wherein:
the first spreading code is assigned according to a logical address at which the first data is to be stored; and
the second spreading code is assigned according to a logical address at which the second data is to be stored.

14. The programming method of claim 10, wherein the spreading code comprises an orthogonal code.

15. The programming method of claim 14, wherein the orthogonal code comprises a Walsh code.

16. The programming method of claim 10, further comprising:
restoring the originally input data by despreading the spread data using the spreading code.

17. The programming method of claim 12, further comprising restoring the first data by despreading the combined data using the first spreading code.

18. The programming method of claim 12, further comprising restoring the second data by despreading the combined data using the second spreading code.

19. A flash memory device comprising:
a memory controller configured to scatter a page of input data in parallel using a spreading code assigned according to a logical address at which the input data is to be stored, and to store the scattered page of input data in a plurality of physical pages of a superpage of data; and
a flash memory configured to store the input data on a superpage-by-superpage basis.

20. The flash memory device of claim 19, wherein the memory controller is further configured to:
scatter a second page of input data in parallel using a second spreading code that is different from the first spreading code.

21. The flash memory device of claim 20, wherein the memory controller is further configured to:
combine the scattered page of input data and the second scattered page of input data to generate combined data; and
store the combined data in a plurality of physical pages of a second superpage of data.

* * * * *